United States Patent
Stern et al.

(10) Patent No.: US 8,935,147 B2
(45) Date of Patent: Jan. 13, 2015

(54) RUNTIME DATA LANGUAGE SELECTION IN OBJECT INSTANCE

(75) Inventors: Andre Stern, Ladenburg (DE);
Christoph Kernke, Einhausen (DE);
Heinz Willumeit, St. Leon-Rot (DE);
Udo Arend, Heidelberg (DE)

(73) Assignee: SAP SE, Walldorf (DE)

( * ) Notice: Subject to any disclaimer, the term of this patent is extended or adjusted under 35 U.S.C. 154(b) by 1419 days.

(21) Appl. No.: 11/967,959

(22) Filed: Dec. 31, 2007

(65) Prior Publication Data

US 2009/0171655 A1   Jul. 2, 2009

(51) Int. Cl.
*G06F 17/28* (2006.01)
*G06Q 10/00* (2012.01)

(52) U.S. Cl.
CPC ..................................... *G06Q 10/00* (2013.01)
USPC ....................................... 704/2; 704/3; 704/8

(58) Field of Classification Search
CPC .................................................. G06F 17/289
USPC ......................................................... 704/1–10
See application file for complete search history.

(56) References Cited

U.S. PATENT DOCUMENTS

| | | | | |
|---|---|---|---|---|
| 5,528,491 A * | 6/1996 | Kuno et al. | | 704/9 |
| 5,568,383 A * | 10/1996 | Johnson et al. | | 704/2 |
| 5,583,761 A * | 12/1996 | Chou | | 715/201 |
| 5,664,206 A * | 9/1997 | Murow et al. | | 704/8 |
| 6,345,243 B1 * | 2/2002 | Clark | | 704/2 |
| 7,509,318 B2 * | 3/2009 | Shaath et al. | | 1/1 |
| 7,536,294 B1 * | 5/2009 | Stanz et al. | | 704/3 |
| 7,539,619 B1 * | 5/2009 | Seligman et al. | | 704/277 |
| 7,559,033 B2 * | 7/2009 | Boss et al. | | 715/769 |
| 7,739,255 B2 * | 6/2010 | Hengel et al. | | 707/705 |
| 2003/0046059 A1 * | 3/2003 | Litster et al. | | 704/8 |
| 2004/0049374 A1 * | 3/2004 | Breslau et al. | | 704/2 |
| 2004/0102956 A1 * | 5/2004 | Levin | | 704/2 |
| 2005/0021533 A1 * | 1/2005 | Ayachitula et al. | | 707/100 |
| 2006/0271349 A1 * | 11/2006 | Scanlan | | 704/2 |
| 2007/0124675 A1 * | 5/2007 | Ban et al. | | 715/703 |
| 2008/0133216 A1 * | 6/2008 | Togami | | 704/4 |

* cited by examiner

*Primary Examiner* — Shaun Roberts

(74) *Attorney, Agent, or Firm* — Schwegman Lundberg & Woessner, P.A.

(57) ABSTRACT

A method of handling different languages in an object, such as a business object includes receiving a language selection indication within a business object instance interface. Data within the business object is displayed for at least one data field in the selected language. Edited data for at least one data field within the business object is received, and other language versions of the edited data in the at least one data field may be modified.

19 Claims, 5 Drawing Sheets

FIG. 4

RUNTIME DATA LANGUAGE SELECTION IN OBJECT INSTANCE

BACKGROUND

The selection of a language for display to a user by computer programs is usually selected during installation of computer programs as part of a set-up routine, or by an administrator. In some cases, a user may access a profile, and select a different language. Multiple languages for programs may also be provided for fixed fields that display program options. Thus, the user interface may change to the selected language. In such cases, there is no ability for a user to easily change the presented text, other than to select a different language. The text is preprogrammed in, and a user may only switch between displays in the different languages.

BRIEF DESCRIPTION OF THE DRAWINGS

FIG. 4 is a block diagram of an example computer system capable of performing methods according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
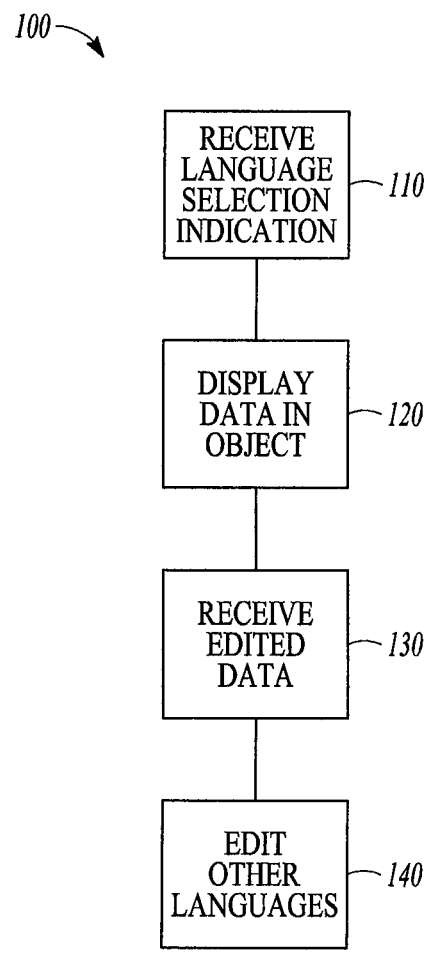
FIG. 1 is a flow chart illustrating a method of runtime language selection according to an example embodiment.

A flowchart in FIG. 1 illustrates a computer implemented method 100 related to language selection during running of an instance of an object, such as a business object. In one embodiment, a language selection indication within the business object is received at 110. Data within the business object is displayed at 120 for at least one data field in the selected language. A user or other entity such as a process may edit data in the data field. The edited data is received at 130 for at least one data field within the business object. Other language versions of the edited data in the at least one data field may be modified at 140.

In one embodiment, a user provides translated text for modifying other language versions of the edited data in the at least one data field. The method 100 may at 120 provide a user a further window, or a pane within a current window, wherein the pane contains editable data corresponding to the at least one data field in a selected language. In a further embodiment, an external auto-translation service may be accessed to modify other language versions of the edited data in the at least one data field. The external auto-translation service may be provided by an Internet server in one embodiment.

In one embodiment, the data field may be logon text, which is automatically displayed in the selected language. In a further embodiment, a user may be provided a user interface mask to the business object. The edited data in the at least one data field is received from a pane in the user interface mask. The pane may be capable of receiving text copied from a translation source and pasted into the pane. In yet a further embodiment, all language dependent fields from all views of a current business object may be collected.

In a further embodiment, one may logon to an application providing a view of data in the object in a first language, such as English. The language selection button or switch is selectable to allow editing or modification of the data in a second language, such as German. The language switch may be operable to pull up all language dependent data in the object, and facilitate changing of the language dependent data in one more languages without logging out of the application.

Figure 2:
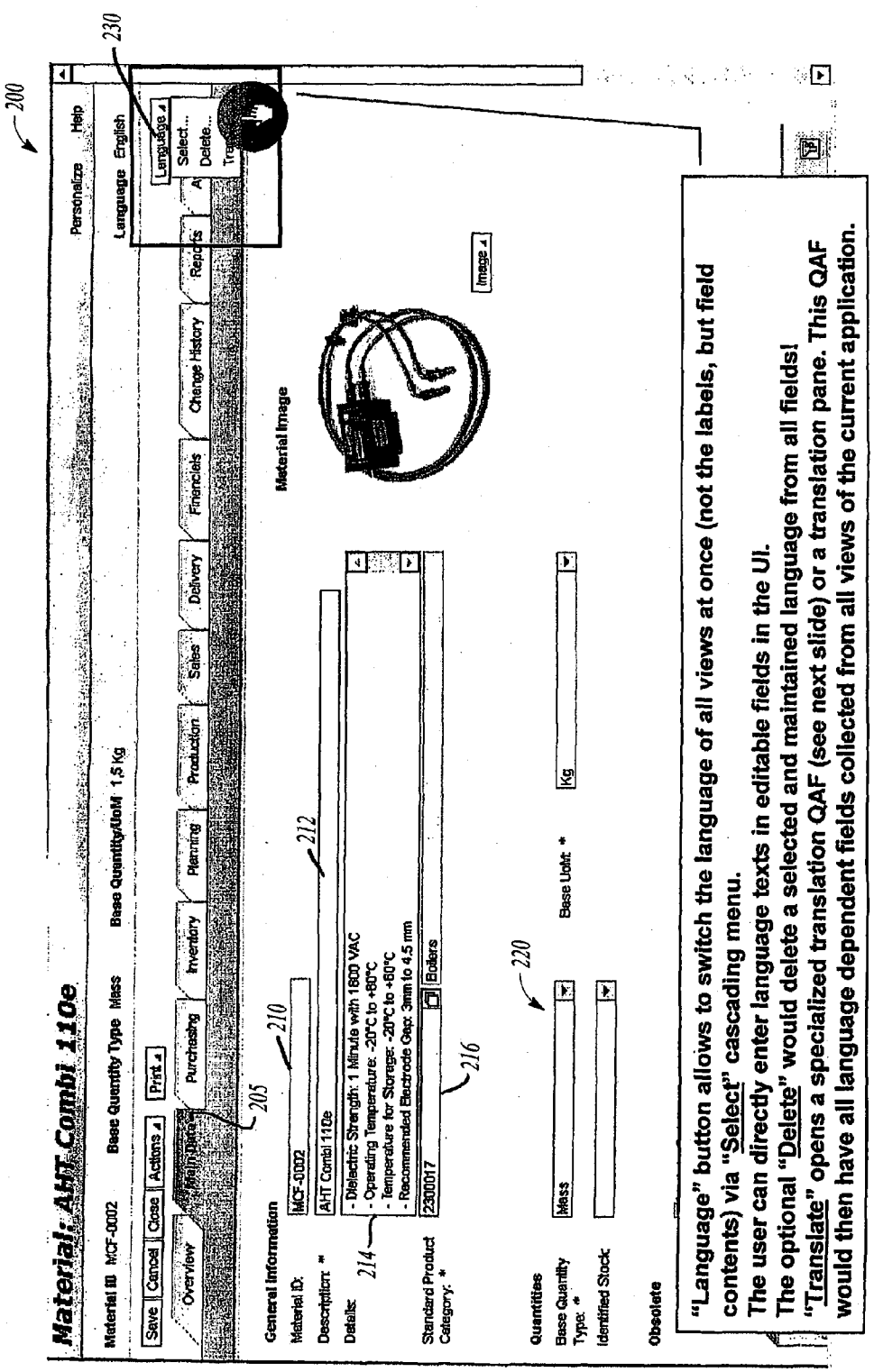
FIG. 2 is a screen shot of a user interface into an instance of a business object according to an example embodiment.

FIG. 2 is a screen shot of a user interface 200 into an instance of an object, such as a business object in a business management computer application according to an example embodiment. In one embodiment, the business object and application are located on a remote server, and accessed by a client, such as a personal computer. A tab 205 for main data has been selected corresponding data and functions are displayed for selection by a user. General information about the business object is provided in the form of field labels and data, including a material ID 210, description 212, details 214, standard product category 216, and information about quantities at 220. Many further or different fields and data may also be provided in the user interface 200 corresponding to the instance of the business object. The fields and data shown are merely examples. FIG. 2 also shows a view of the interface for one tab, main data 205. Other tabs provide different views, such as purchasing, inventory, planning, production, sales, delivery, financials, change history, reports and others or different tabs in various embodiment.

User interface 200 also includes a language switch 230, or other form of interface allowing a user to select a language during the running of the instance of the business object. In one embodiment, language switch 230 is a button having a pull down menu for selecting different methods to perform related to language selection, translation and deletion. Using the switch 230, a language in which to display language dependent data, and optionally field labels may be selected from available languages. A select option allows the switching of all views of the field contents at once. A user can then directly enter language text in editable fields. A delete option deletes selected and maintained language from all fields. A translate option opens a specialized translation pane which in one embodiment collects all language dependent fields from all views of the current instance of the business object.

Figure 3:
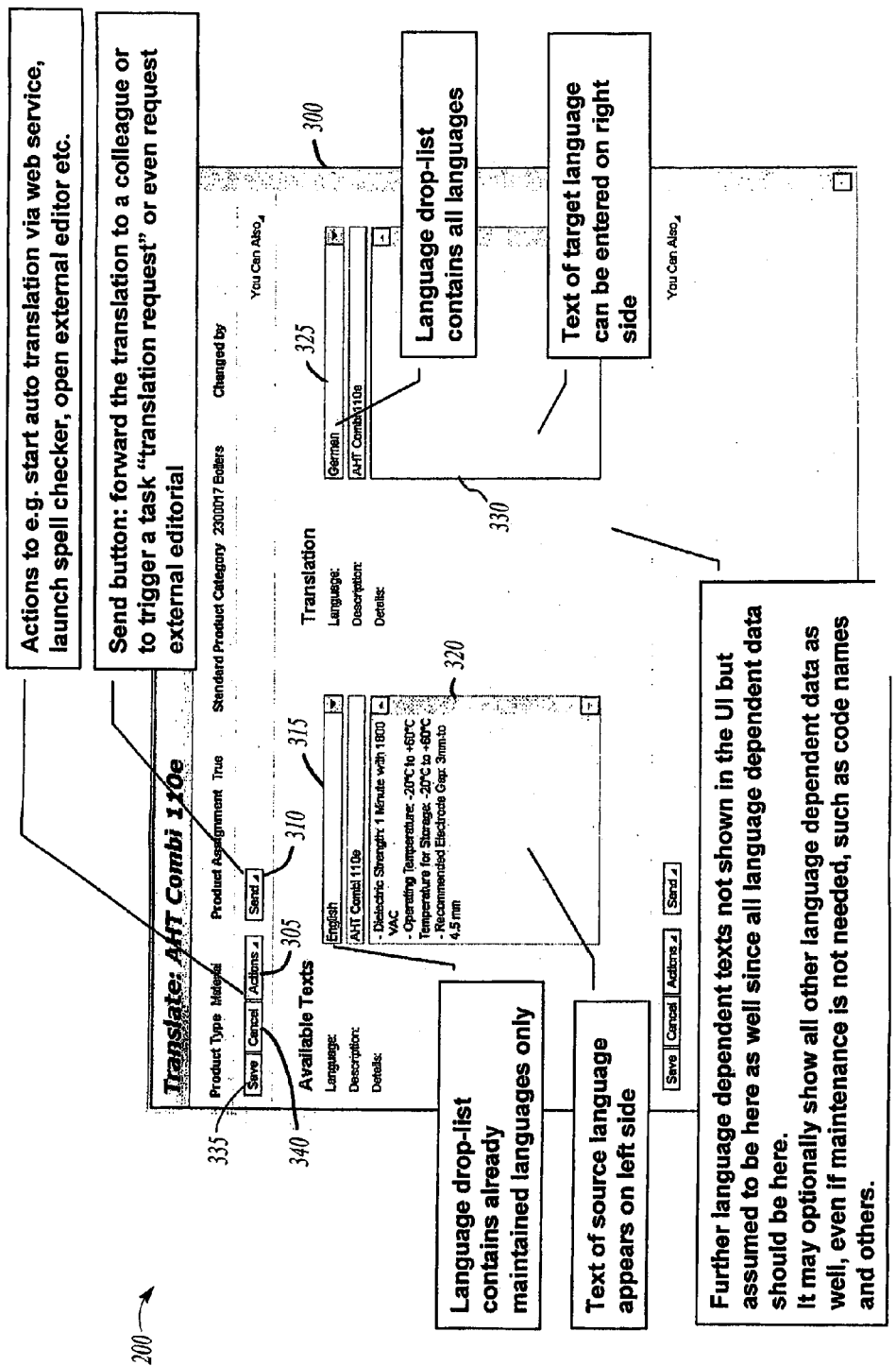
FIG. 3 is a screen shot of a translate pane within the screen shot of FIG. 2 according to an example embodiment.

FIG. 3 is a screen shot of a translate pane 300 which is opened on selection of translate in the language switch of in FIG. 2. The pane is opened within the screen shot 200 of FIG. 2 in one embodiment. The pane identifies several selectable actions via an action button 305, such as starting auto translation via a web service, launching a spell checker, opening an external editor or other actions. A send button 310 allows forwarding a translation to another user or triggering of a translation request task, or event requesting an external editor. Available texts may be accessed via a language drop-list 315 that contains already maintained languages. Text of a source language is displayed at 320. A translation portion of the pane 300 provides a language drop list 325 that contains all languages in the business object, along with text 330 of a target language, which can be entered via direct typing or cutting and pasting. Further language dependent text is not shown, but may be included in the pane, as all language dependent data for the business object may be displayed. Other language dependent data may also be shown, even if maintenance of such other language is not needed. Examples may include code names or other universal expressions. Further buttons on pane 300 may include save button 335, and cancel button 340. These buttons may be duplicated in the pane 300.

Figure 4:
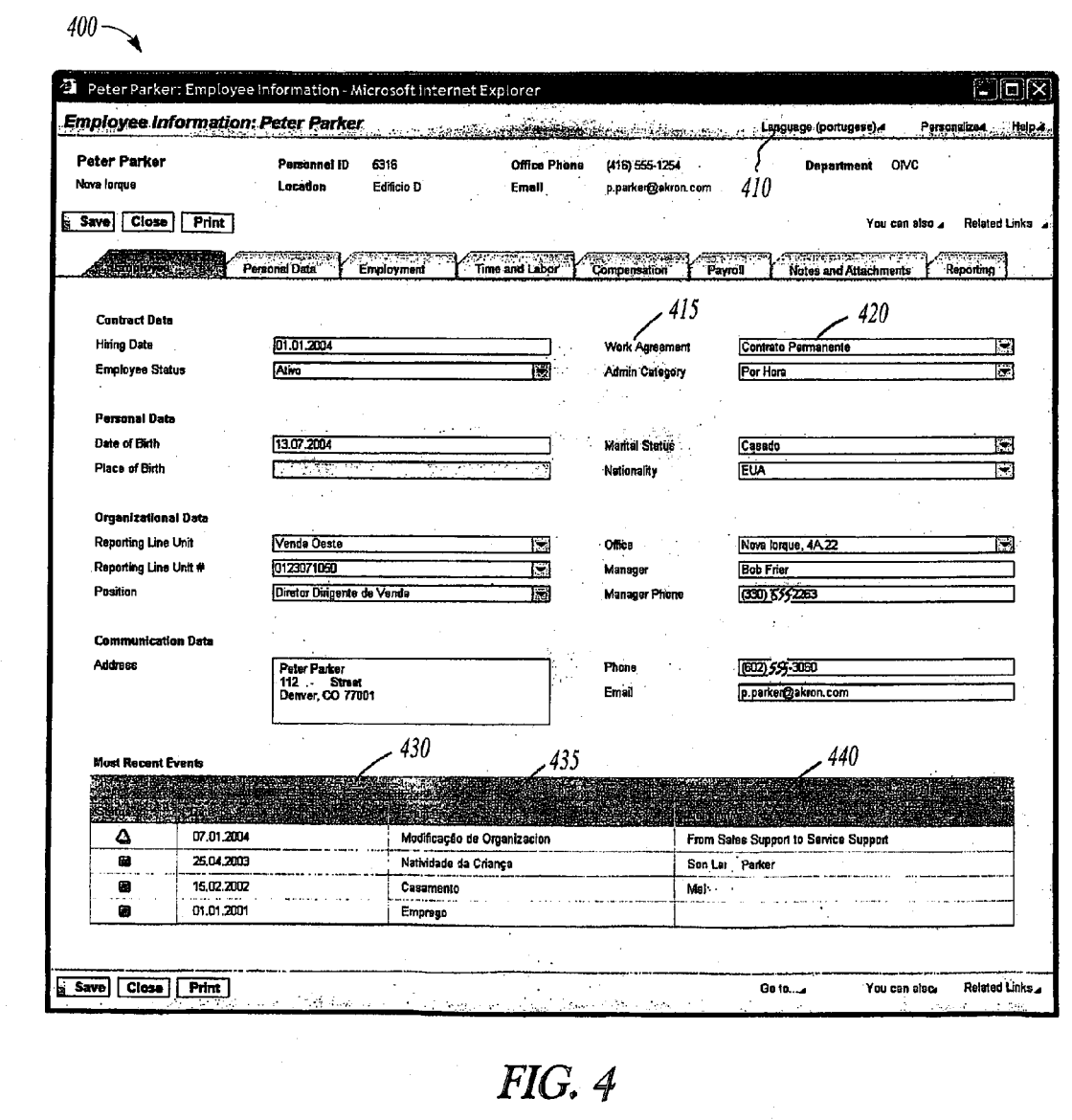

FIG. 4 is a screen shot of a user interface 400 into a business object that holds employee information. A language switch 410 is provided that allows switching languages during running an instance of the employee information object. As seen, the currently selected language for language dependent data is Portuguese. Field labels in this embodiment, as indicated for example at 415, "Work Agreement", are in English. However, the corresponding language dependent data in the field 420 "Contrato Permanente" is in Portuguese. Field 420 is modifiable, such as by use of a pull down menu, to select other standard work agreements. Several other field labels and fields are also present on interface 400. Some fields are free text, and may be modified to contain any desired data. Others have pull down menus and a fixed set of field values. When a different language is selected in this embodiment, the values in the fields may change to reflect the change in language, while the field labels in this embodiment will remain in English. In further embodiments, the field labels may also be displayed in the selected language. The language select button may also be used to provide an editable view of all of the fields, allowing translation as described above.

Interface 400 also contains a list of most recent events at 430, with a date, event 435 and description 440. In this embodiment, the events 435 are identified in Portuguese, while the descriptions 440 are in English. This may be varied in further embodiments.

Figure 5:
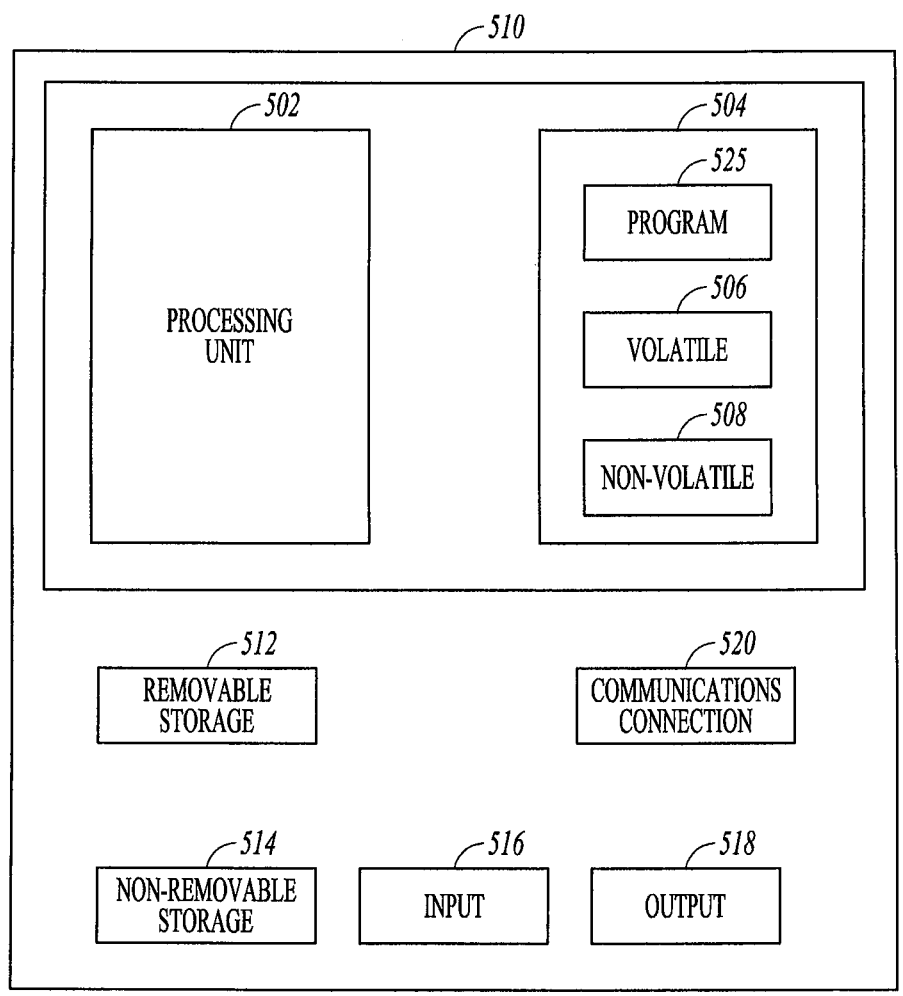
FIG. 5 is a block diagram of an example computer system that executes programming for performing the above algorithms.

A block diagram of a computer system that executes programming for performing the above algorithm is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising:
providing a display of a user interface into an instance of a business object of a logged into application showing multiple fields and data and providing access to functions for user interaction with the instance of the business object to execute functions of the business object;
receiving a first language selection indication using a first language switch within a business object instance interface of the logged into application, the first language selection selecting from a plurality of maintained languages, wherein each maintained language includes available text for at least one data field;
displaying first data for the at least one data field within the business object instance, the first data including the available text presented in the first selected language;
receiving a second language selection indication using a second language switch to display user editable language dependent data within the business object instance interface for at least one language dependent data field for all of several languages without logging out of the application;
displaying second data for the at least one data field within the business object instance, the second data presented in the second selected language, the second data being the same as the first data translated into the second selected language;
receiving edits to the first data into the user interface;
receiving a translation command into the user interface; and
in response to receiving the edits to the first data and receiving the translation command into the user interface, modifying other language versions of the edited first data in the at least one data field, the other language versions including the displayed second data.

2. The method of claim 1 wherein a user provides translated text for modifying other language versions of the edited data in the at least one data field.

3. The method of claim 2 and further comprising providing a user a pane containing editable data corresponding to the at least one data field in a selected language.

4. The method of claim 1 wherein an external auto-translation service is accessed to modify other language versions of the edited data in the at least one data field.

5. The method of claim 4 wherein the external auto-translation service comprises an Internet server.

6. The method of claim 1 wherein the data field comprises logon text.

7. The method of claim 1 and further comprising providing a user interface mask to the business object, and wherein the edited data in the at least one data field is received from a pane in the user interface mask.

8. The method of claim 7 wherein the pane is capable of receiving text copied from a translation source and pasted into the pane.

9. The method of claim 1 and further comprising collecting all language dependent fields from all views of a current business object.

10. A computer implemented method comprising:
providing a display of a user interface into an instance of a business object of a logged into application showing multiple fields and data and providing access to functions for user interaction with the instance of the business object to execute functions of the business object;
displaying a first language switch in a user interface of the application displaying language dependent data during running of the application, the first language switch operable to select a first language from a plurality of maintained languages, wherein each maintained language includes available text for at least one data field;
displaying a second language switch in the user interface of the application displaying language dependent data during running of the application, the second language switch operable to select a second language from all of several languages;
receiving a first language selection indication using the first language switch within the user interface corresponding to the business object instance;
displaying first data within the interface including the available text for at least one maintained language dependent data field in the first selected language;
receiving a second language selection indication using the second language switch within the user interface corresponding to the business object instance;
displaying second data within the interface for at least one user editable language dependent data field, the second data being the same as the first data translated into the second language;
receiving edits to the first data into the user interface for the at least one user editable language dependent field;
receiving a translation command into the user interface; and
in response to receiving the edits to the first data and receiving the translation command into the user interface, modifying other language versions of the edited first data in the at least one data field without logging out of the application, the other language versions including the displayed second data.

11. The computer implemented method of claim 10 wherein the second language switch comprises a pull down menu providing a language translation option.

12. The computer implemented method of claim 11 and further comprising providing a language translation screen upon receiving an indication from the second language switch that a language translation option has been selected.

13. The method of claim 12 wherein an external auto-translation service is accessed to modify other language versions of the edited data in the at least one data field.

14. The method of claim 13 wherein the external auto-translation service comprises an Internet server.

15. The method of claim 12 and further comprising providing a user interface mask to the business object, and wherein the edited data in the at least one data field is received from a pane in the user interface mask.

16. The method of claim 15 wherein the pane is capable of receiving text copied from a translation source and pasted into the pane.

17. The method of claim 12 and further comprising collecting all language dependent fields from all views of a current business object.

18. The method of claim 10 wherein the data field comprises logon text.

19. A non-transitory computer readable medium having instructions thereon for causing a computer to implement a method comprising:
providing a display of a user interface into an instance of a business object of a logged into application showing multiple fields and data and providing access to functions for user interaction with the instance of the business object to execute functions of the business object;
receiving a first language selection indication using a first language switch within a business object instance interface of the logged into application, the first language selection selecting from a plurality of maintained languages, wherein each maintained language includes available text for at least one data field;
displaying first data for the at least one data field within the business object instance, the first data including the available text presented in the first selected language;
receiving a second language selection indication using a second language switch to display user editable language dependent data within the business object instance interface for at least one language dependent data field for all of several languages without logging out of the application;
displaying second data for the at least one data field within the business object instance, the second data presented in the second selected language, the second data being the same as the first data translated into the second selected language;
receiving edits to the first data into the user interface;
receiving a translation command into the user interface; and
in response to receiving the edits to the first data and receiving the translation command into the user interface, modifying other language versions of the edited first data in the at least one data field using the language switch to display all language versions without logging out of the application, the other language versions including the displayed second data.

* * * * *